(12) United States Patent
Matsumoto

(10) Patent No.: US 8,285,843 B2
(45) Date of Patent: Oct. 9, 2012

(54) REMOTE MONITORING SYSTEM

(75) Inventor: Tadashi Matsumoto, Osaka (JP)

(73) Assignee: Panasonic Corporation, Osaka (JP)

( * ) Notice: Subject to any disclaimer, the term of this patent is extended or adjusted under 35 U.S.C. 154(b) by 209 days.

(21) Appl. No.: 12/933,060

(22) PCT Filed: Mar. 17, 2009

(86) PCT No.: PCT/JP2009/055201
§ 371 (c)(1),
(2), (4) Date: Sep. 16, 2010

(87) PCT Pub. No.: WO2009/116542
PCT Pub. Date: Sep. 24, 2009

(65) Prior Publication Data
US 2011/0016212 A1    Jan. 20, 2011

(30) Foreign Application Priority Data
Mar. 18, 2008  (JP) .................. 2008-070033

(51) Int. Cl.
G06F 15/16 (2006.01)
G06F 15/173 (2006.01)
(52) U.S. Cl. ......... 709/224; 709/203; 709/230; 709/246
(58) Field of Classification Search .................. 709/223, 709/224; 455/67.11, 182.2; 370/232, 252, 370/254, 338
See application file for complete search history.

(56) References Cited

U.S. PATENT DOCUMENTS
6,700,875 B1 * 3/2004 Schroeder et al. ............ 370/252
(Continued)

FOREIGN PATENT DOCUMENTS
EP    0 298 133 A1    1/1989
(Continued)

OTHER PUBLICATIONS
International Search Report for the Application No. PCT/JP2009/055201 mailed Apr. 14, 2009.

*Primary Examiner* — Quang N. Nguyen
(74) *Attorney, Agent, or Firm* — Cheng Law Group, PLLC

(57) ABSTRACT

A first relay (30) and a plurality of second relays (40) are interposed between a data collection device (10) and a plurality of monitoring terminals (20). The first relay (30) is connected to the data collection device (10). The plurality of the second relays (40) is connected to the first relay (30). Each of the second relays (40) is connected to a plurality of the monitoring terminals (20). The data collection device (10) and the first relay (30) are communicated with each other according to a main protocol as in the past. The second relay (40) and the monitoring terminal (20) are communicated with each other according to the main protocol. By contrast, the first relay (30) and the second relay (40) are communicated with each other according to an auxiliary protocol different from the main protocol.

8 Claims, 2 Drawing Sheets

U.S. PATENT DOCUMENTS

| | | | |
|---|---|---|---|
| 6,728,523 B1 * | 4/2004 | Ohba et al. | 455/182.2 |
| 6,768,787 B1 * | 7/2004 | Pester, III | 379/32.03 |
| 7,911,950 B2 * | 3/2011 | Edsall et al. | 370/232 |
| 2004/0133668 A1 * | 7/2004 | Nicholas, III | 709/223 |
| 2006/0146764 A1 * | 7/2006 | Takemoto et al. | 370/338 |
| 2006/0227721 A1 * | 10/2006 | Hirai et al. | 370/254 |
| 2008/0002761 A1 * | 1/2008 | Edsall et al. | 375/222 |
| 2008/0305743 A1 * | 12/2008 | Aithal et al. | 455/67.11 |
| 2011/0016212 A1 * | 1/2011 | Matsumoto | 709/224 |

FOREIGN PATENT DOCUMENTS

| | | |
|---|---|---|
| JP | 61-30146 A | 2/1986 |
| JP | 63-178396 A | 7/1988 |
| JP | 5-159078 A | 6/1993 |
| JP | 9-135484 A | 5/1997 |
| JP | 11-164117 A | 6/1999 |
| JP | 2003-8600 A | 1/2003 |
| JP | 2007-295163 A | 11/2007 |

* cited by examiner

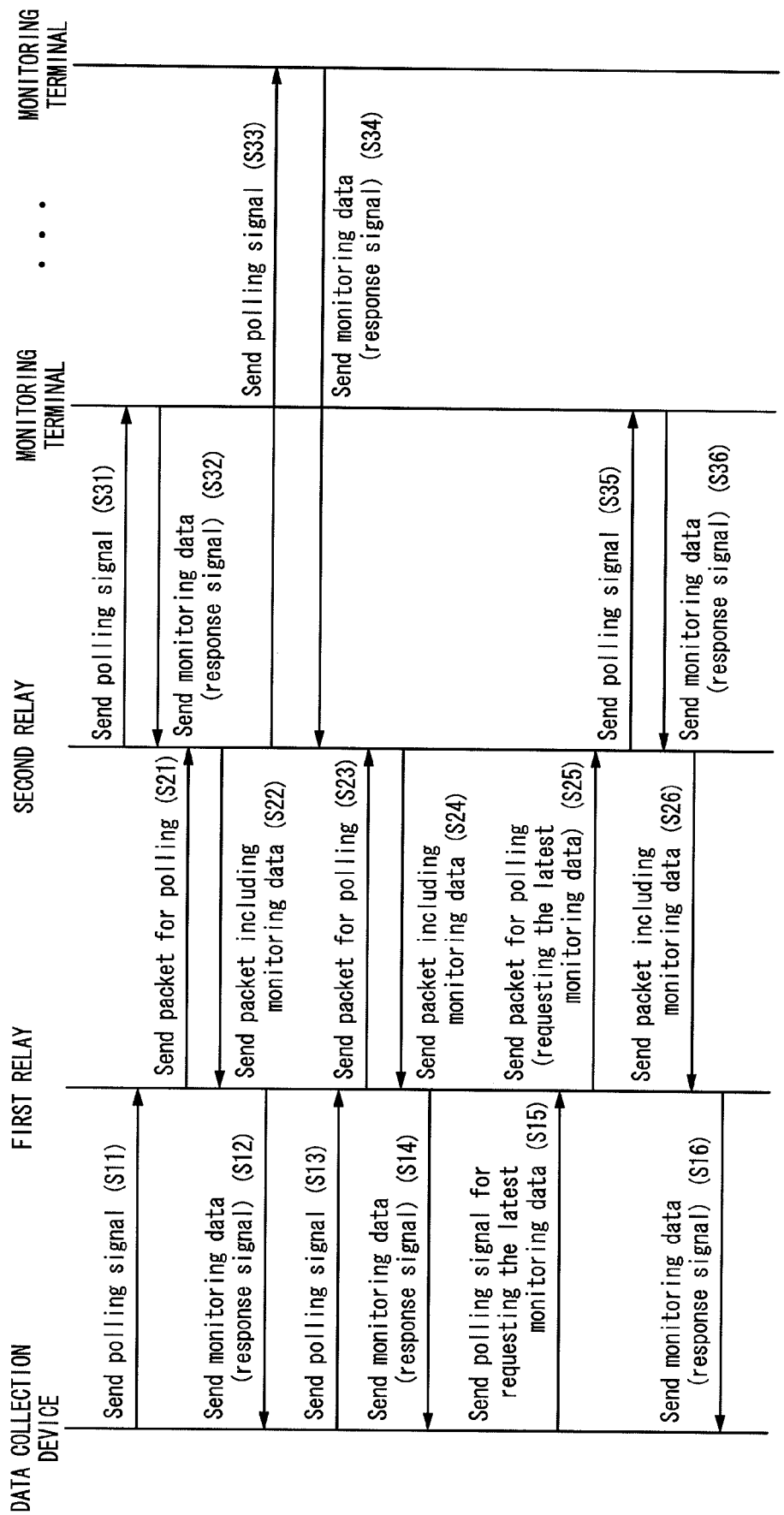

REMOTE MONITORING SYSTEM

TECHNICAL FIELD

The present invention is directed to remote monitoring systems, and more particular to a remote monitoring system including a plurality of monitoring terminals configured to monitor electronic devices and a data collection device configured to collect monitoring data from the plurality of the monitoring terminals.

BACKGROUND ART

In the past, there has been proposed a remote monitoring system which includes a plurality of monitoring terminals (slave stations) configured to monitor an electric device and generate a monitoring data indicative of monitoring information of the monitored electric device, and a data collection device (master station) configured to collect the monitoring data from the plurality of the monitoring terminals (see Japanese patent laid-open publication No. 2007-295163).

In the conventional remote monitoring system, the plurality of the monitoring terminals is connected to the data collection device via a two wire system communication cable. The data collection device is configured to poll the monitoring terminals to collect the monitoring data from the monitoring terminals. That is, the data collection device transmits the polling signal to the plural monitoring terminals in sequence. Upon receiving the polling signal, the respective monitoring terminals transmit a response signal including the own monitoring data to the data collection device. Consequently, the data collection device collects the monitoring data from all the monitoring terminals.

RS 485 is relatively common as a communication method between the data collection device and the monitoring terminals. However, RS 485 has the maximum connectable number of 32. Therefore, if the number of the monitoring terminals exceeds 32, the remote monitoring system needs a plurality of the data collection devices. In this situation, the remote monitoring system needs an additional device which collects the monitoring data from the plurality of the data collection devices.

DISCLOSURE OF INVENTION

In view of the above insufficiency, the present invention has been aimed to propose a remote monitoring system which is capable of alleviating the restriction of the connectable number which would otherwise depend on the communication method between the data collection device and the monitoring terminals, yet without changing the communication method.

The remote monitoring system in accordance with the present invention including a plurality of monitoring terminals each configured to monitor an electric device and generate a monitoring data indicative of monitoring information of the electric device, and a data collection device configured to poll the plurality of the monitoring terminals to collect the monitoring data therefrom. The remote monitoring system includes a first relay connected to the data collection device, and a plurality of second relays each connected to the first relay and a plurality of the monitoring terminals. The data collection device is configured to send a polling signal for the monitoring terminal to the first relay in accordance with a main protocol. Each of the monitoring terminals is configured to, upon receiving the polling signal, send a response signal including the monitoring data to the connected second relay in accordance with the main protocol. The first relay includes a first main protocol communication unit, a first auxiliary protocol communication unit, a first protocol conversion unit configured to transfer a signal between the first main protocol communication unit and the first auxiliary protocol communication unit. The first main protocol communication unit is configured to communicate with the data collection device in accordance with the main protocol. The first auxiliary protocol communication unit is configured to communicate with the plurality of the second relays in accordance with an auxiliary protocol different from the main protocol. The first protocol conversion unit is configured to make a protocol conversion between the main protocol and the auxiliary protocol when transferring a signal. The second relay includes a second auxiliary protocol communication unit, a second main protocol communication unit, a second protocol conversion unit configured to transfer a signal between the second auxiliary protocol communication unit and the second main protocol communication unit. The second auxiliary protocol communication unit is configured to communicate with the first relay in accordance with the auxiliary protocol. The second main protocol communication unit is configured to communicate with the connected monitoring terminal in accordance with the main protocol. The second protocol conversion unit is configured to make a protocol conversion between the main protocol and the auxiliary protocol when transferring a signal. A communication speed between the data collection device and the first relay is selected to be faster than a communication speed between the monitoring terminal and the second relay.

According to the present invention, the data collection device and the monitoring terminal communicate with each other in accordance with the main protocol as is made conventionally. By contrast, the first relay and the second relay both interposed between the data collection device and the monitoring terminal communicate with each other in accordance with the auxiliary protocol different from the main protocol. Therefore, it is possible to alleviate the restriction of the connectable number which would otherwise depend on the communication method between the data collection device and the monitoring terminals, yet without changing the communication method.

In a preferred embodiment, the remote monitoring system includes a communication cable which has two signal lines for connection of the second relay and the first relay. The first relay includes a power unit configured to supply an electric power, which is generated from the DC voltage applied across the two signal lines, to the first main protocol communication unit, the first auxiliary protocol communication unit, and the first protocol conversion unit.

According to the present embodiment, it is possible to supply power to the first relay via the communication cable for connection of the first relay and the second relay. Thus, since the first relay does not need to be connected to an external power source (e.g. commercial power source) by use of a dedicated power line, the first relay can be easily installed.

In a preferred embodiment, the remote monitoring system includes a communication cable which has two signal lines for connection of the second relay and the first relay. The second relay includes a power unit configured to supply an electric power, which is generated from the DC voltage applied across the two signal lines, to the second main protocol communication unit, the second auxiliary protocol communication unit, and the second protocol conversion unit.

According to the present embodiment, it is possible to supply power to the second relay via the communication cable for connection of the first relay and the second relay. Thus, since the second relay does not need to be connected to an external power source (e.g. commercial power source) by use of a dedicated power line, the second relay can be easily installed.

In a preferred embodiment, the second relay includes a monitoring data collection unit configured to poll the monitoring terminal connected to the second relay to collect the monitoring data therefrom, and a storage unit configured to store the monitoring data collected by the monitoring data collection unit. The monitoring data collection unit is configured to, when the second auxiliary protocol communication unit receives the polling signal corresponding to the monitoring terminal connected to the second relay, retrieve from the storage unit the monitoring data of the monitoring terminal corresponding to the received polling signal and send the same to the second protocol conversion unit. The second protocol conversion unit is configured to convert the monitoring data received from the monitoring data collection unit into a signal in conformity with the auxiliary protocol, and send the same to the second auxiliary protocol communication unit.

According to the preferred embodiment, it is possible to shorten the time necessitated for the data collection device to collect the monitoring data of the monitoring terminals.

More preferably, the data collection device is configured to send the polling signal which includes identification information indicative of whether or not the data collection device requires the latest monitoring data. The second relay is configured to judge, with reference to the identification information included in the received polling signal, whether or not the data collection device requires the latest monitoring data. The second relay is configured to send the received polling signal to the second main protocol communication unit upon judging that the data collection device requires the latest monitoring data. The second relay is configured to send the monitoring data stored in the storage unit to the second protocol conversion unit upon judging that the data collection device does not require the latest monitoring data.

According to the preferred embodiment, it is possible to collect the latest monitoring data as necessary.

BRIEF DESCRIPTION OF DRAWINGS

FIG. 2 is a time chart illustrating a communication sequence of the aforementioned remote monitoring system.

BEST MODE FOR CARRYING OUT THE INVENTION

Figure 1:
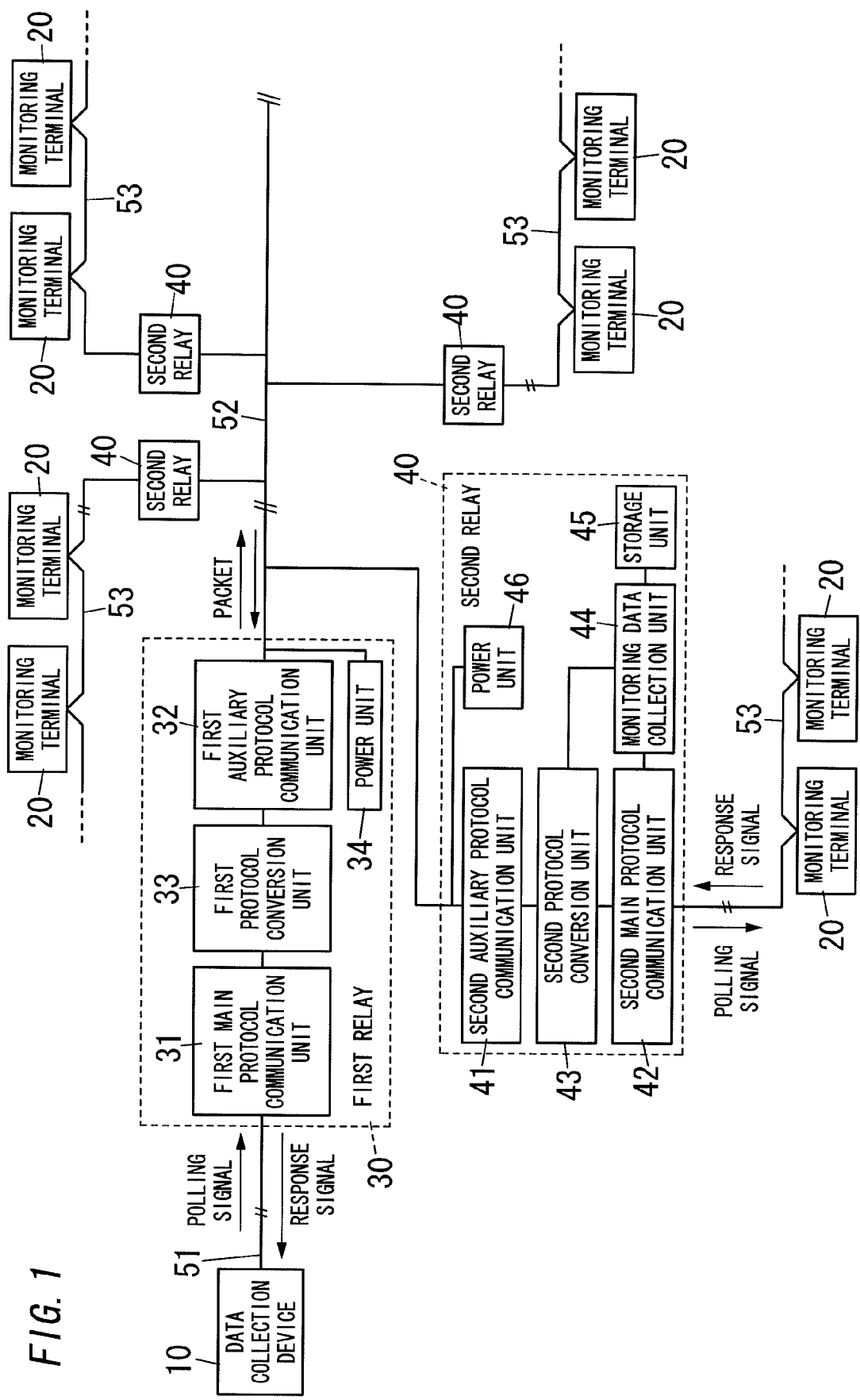
FIG. 1 is a diagram illustrating a system configuration of a remote monitoring system of one embodiment in accordance with the present invention.

As shown in FIG. 1, the remote monitoring system of one embodiment in accordance with the present invention includes one data collection device 10 and a plurality of monitoring terminals 20. Each of the monitoring terminals 20 is configured to monitor an electric device (not shown) and generate a monitoring data indicative of monitoring information of the electric device connected thereto. The data collection device 10 is configured to poll the plurality of the monitoring terminals 20 to collect the monitoring data from the plurality of the monitoring terminals 20. For example, when collecting the monitoring data from the monitoring terminals 20, the data collection device 10 outputs a polling signal for the monitoring terminals 20 in conformity with a main protocol. The monitoring terminal 20 sends a response signal including the monitoring data to the data collection device 10 in conformity with the main protocol when a destination address of the received polling signal is identical to own address. For example, the monitoring terminal 20 is an electrical power meter which measures a consumed power of an equipment device. In this situation, the monitoring information indicates a measurement measured by the electrical power meter. As mentioned in the above, the data collection device 10 identifies the respective monitoring terminals 20 by unique addresses of the monitoring terminals 20. The data collection device 10 polls all the monitoring terminals 20 in sequence at a constant period to collect the monitoring data from all the monitoring terminals 20.

Additionally, in the remote monitoring system of the present embodiment, the plurality of the monitoring terminals 20 is connected to the data collection device 10 via one first relay 30 and a plurality of second relays 40. For example, the first relay 30 is connected to the data collection device 10 via a first communication cable 51. The plurality of the second relays 40 is connected to the first relay 30 via a second communication cable 52. The plural monitoring terminals 20 are connected in series to the second relay 40 by use of a third communication cable 53. That is, the plural monitoring terminals 20 are connected to the second relay 40 in a series wiring manner.

Herein, the second communication cable 52 is a two wire system communication cable including two signal lines. The second communication cable 52 is connected to a DC power source such as a solar cell, a fuel cell, and an AC/DC converter, and receives a DC voltage applied between the two signal lines.

The first relay 30 includes a first main protocol communication unit 31, a first auxiliary protocol communication unit 32, a first protocol conversion unit 33, and a power unit 34.

The first main protocol communication unit 31 is configured to communicate with the data collection device 10 in accordance with the main protocol. In the present embodiment, the first main protocol communication unit 31 is configured to communicate with the data collection device 10 in a polling method in accordance with a communication method of RS 485.

The first auxiliary protocol communication unit 32 is configured to communicate with the plurality of the second relays 40 according to an auxiliary protocol different from the main protocol. In the present embodiment, the first auxiliary protocol communication unit 32 is configured to communicate with the plurality of the second relays 40 according to a digital modulation/demodulation method (e.g. BPSK and QPSK).

The first protocol conversion unit 33 is configured to transfer a signal between the first main protocol communication unit 31 and the first auxiliary protocol communication unit 32. In addition, the first protocol conversion unit 33 is configured to make a protocol conversion between the main protocol and the auxiliary protocol when transferring a signal between the first main protocol communication unit 31 and the first auxiliary protocol communication unit 32. That is, the first protocol conversion unit 33 has a function which converts between a signal (polling signal and response signal) in conformity with the main protocol and a signal (digitally modulated packet) in conformity with the auxiliary protocol.

The power unit 34 is configured to supply an electric power generated from the DC voltage applied between the two signal lines of the second communication cable 52 to the first main protocol communication unit 31, the first auxiliary protocol communication unit 32, and the first protocol conversion unit 33. Therefore, it is possible to supply power to the first relay 30 via the second communication cable 52. Thus, since the first relay 30 does not need to be connected to an external power source (e.g. commercial power source) by use of a dedicated power line, the first relay 30 can be easily installed.

The second relay 40 includes a second auxiliary protocol communication unit 41, a second main protocol communication unit 42, a second protocol conversion unit 43, a monitoring data collection unit 44, a storage unit 45, and a power unit 46.

The second auxiliary protocol communication unit 41 is configured to communicate with the first relay 30 according to the auxiliary protocol. In the present embodiment, the second auxiliary protocol communication unit 41 is configured to communicate with the first relay 30 according to the digital modulation/demodulation method (e.g. BPSK and QPSK).

The second main protocol communication unit 42 is configured to communicate with the monitoring terminals 20 according to the main protocol. In the present embodiment, the second main protocol communication unit 42 is configured to communicate with a plurality (the maximum number is 31) of the monitoring terminals 20 in the polling method according to the communication method of RS 485.

The second protocol conversion unit 43 is configured to transfer a signal between the second auxiliary protocol communication unit 41 and the second main protocol communication unit 42. In addition, the second protocol conversion unit 43 is configured to make a protocol conversion between the main protocol and the auxiliary protocol when transferring a signal between the second auxiliary protocol communication unit 41 and the second main protocol communication unit 42. That is, the second protocol conversion unit 43 has a function which converts between a signal (polling signal and response signal) in conformity with the main protocol and a signal (digitally modulated packet) in conformity with the auxiliary protocol.

Therefore, the second auxiliary protocol communication unit 41 transmits to the monitoring terminal 20 via the third communication cable 53 the polling signal converted by the second protocol conversion unit 43. The second auxiliary protocol communication unit 41 further receives the response signal of the monitoring terminal 20 polled by the polling signal and sends the received response signal to the second protocol conversion unit 43.

The monitoring data collection unit 44 is configured to poll the monitoring terminals 20 connected to the second relay 40 in sequence to collect the monitoring data of each of the monitoring terminals 20. That is, like the data collection device 10, the monitoring data collection unit 44 identifies the respective monitoring terminals 20 connected to the second relay 40 via the third communication cable 53 by used of addresses thereof. The monitoring data collection unit 44 polls the plural monitoring terminals 20 in sequence at a constant period to collect the monitoring data therefrom.

The storage unit 45 is configured to store the monitoring data collected by the monitoring data collection unit 44. For example, the storage unit 45 is a rewritable, nonvolatile semiconductor memory (e.g. EEPROM). The monitoring data is stored and is associated with the address of the monitoring terminal 20 which generates the monitoring data. In addition, the storage unit 45 stores the addresses of the monitoring terminals 20 which are connected to the second main protocol communication unit 42 via the third communication cable 53.

The power unit 46 is configured to supply an electric power, which is generated from the DC voltage applied between the two signal lines of the second communication cable 52, to the second auxiliary protocol communication unit 41, the second main protocol communication unit 42, the second protocol conversion unit 43, the monitoring data collection unit 44, and the storage unit 45. Therefore, it is possible to supply power to the second relay 40 via the second communication cable 52. Thus, since the second relay 40 does not need to be connected to an external power source (e.g. commercial power source) by use of a dedicated power line, the second relay 40 can be easily installed. If the second relay 40 does not include the monitoring data collection unit 44 and the storage unit 45, the power unit 46 is configured to supply an electric power, which is generated from the aforementioned DC voltage, to the second auxiliary protocol communication unit 41, the second main protocol communication unit 42, and the second protocol conversion unit 43.

Next, an explanation is made to an operational sequence of the remote monitoring system of the present embodiment, with reference to the time chart shown in FIG. 2.

The monitoring data collection unit 44 of the second relay 40 sends the polling signal to the monitoring terminals 20 in sequence (S31, S33). The polled monitoring terminal 20 (monitoring terminal 20 having own address identical to a destination address of the polling signal sent by the monitoring data collection unit 44) sends the response signal. Thus, the monitoring data collection unit 44 collects the monitoring data from the monitoring terminals 20 (S32, S34). In addition, the storage unit 45 associates the monitoring data collected by the monitoring data collection unit 44 with the address of the corresponding monitoring terminal 20 and stores the same.

The data collection device 10 also sends the polling signal to all the monitoring terminals 20 in sequence (S11, S13). The polling signal of the data collection device 10 is received at the first main protocol communication unit 31 of the first relay 30. The first protocol conversion unit 33 encapsulates the polling signal (address of the monitoring terminal 20 to be polled) received by the first main protocol communication unit 31, thereby generating a packet in conformity with the auxiliary protocol. Thereafter, the first protocol conversion unit 33 sends the generated packet to the first auxiliary protocol communication unit 32. The first auxiliary protocol communication unit 32 transmits the packet generated by the first protocol conversion unit 33 to the second relay 40 (S21, S23). It is noted that a broadcast address is designated as the destination address of the packet generated (converted) by the first protocol conversion unit 33. This packet is received by the second auxiliary protocol communication units 41 of all the second relays 40 connected to the second communication line 52.

When the first relay 30 is configured to have address information indicative of a specific one of the second relays 40 which is connected to the monitoring terminal 20 defined by the destination address of the polling signal, the first relay 30 can be made to designate the destination address only as the address of the second relay 40 connected to the monitoring terminal 20 defined by the destination address of the polling signal, thereby establishing unicast communication for sending the packet.

The second protocol conversion unit 43 of the second relay 40 acquires the polling signal (address of the monitoring terminal 20) encapsulated into the packet from the packet received by the second auxiliary protocol communication unit 41. In this situation, when the destination address of the polling signal is not identical to the address of the monitoring terminal 20 stored in the storage unit 45, the packet is discarded. Meanwhile, when the destination address of the polling signal is identical to the address of the monitoring terminal 20 stored in the storage unit 45, the monitoring data collection unit 44 reads out the monitoring data defined by the address identical to the destination address of the polling signal from the storage unit 45 and sends the same to the second protocol conversion unit 43. Thus, the second protocol conversion unit 43 encapsulates the response signal including the monitoring data received from the monitoring data collection unit 44 together with the address associated with the received monitoring data, thereby generating the packet. Thereafter, the second protocol conversion unit 43 sends the generated packet to the second auxiliary protocol communication unit 41. The second auxiliary protocol communication unit 41 transmits the packet generated by the second protocol conversion unit 43 to the first relay 30 (S22, S24). It is noted that the address of the first relay 30 is designated as the destination address of the packet generated (converted) by the second protocol conversion unit 43. Therefore, only the first relay 30 receives the packet transmitted by the second auxiliary protocol communication unit 41.

When the first auxiliary protocol communication unit 32 receives the packet, the first protocol conversion unit 33 obtains the response signal (monitoring data and address of the monitoring terminal 20) encapsulated into the received packet and sends the same to the first main protocol communication unit 31. The first main protocol communication unit 31 transmits to the data collection device 10 the response signal received from the first protocol conversion unit 33 (S12, S14). The remote monitoring system repeats the aforementioned procedure periodically, thereby allowing the data collection device 10 to collect the monitoring data from all the monitoring terminals 20.

In the above instance, the second relay 40 preliminarily collects the monitoring data from the monitoring terminals 20. Therefore, the storage unit 45 stores the previous monitoring data obtained prior to the time of polling the data collection device 10. The remote control system may require the monitoring data (the latest monitoring data) at the time of polling the data collection device 10, rather than the previous monitoring data (the old monitoring data).

Therefore, the data collection device 10 of the present embodiment is configured to send the polling signal which includes identification information (identification flag) indicative of whether or not the data collection device 10 requires the latest monitoring data.

The monitoring data collection unit 44 is configured to judge that the data collection device 10 requires the latest monitoring data when the identification flag is on, and to judge that the data collection device 10 does not requires the latest monitoring data when the identification flag is off.

When the monitoring data collection unit 44 judges that the data collection device 10 requires the latest monitoring data, the second protocol conversion unit 43 sends to the second main protocol communication unit 42 the polling signal obtained from the packet received by the second auxiliary protocol communication unit 41. In this situation, the monitoring data collection unit 44 does not send the monitoring data stored in the storage unit 45 to the second protocol conversion unit 43.

By contrast, when the monitoring data collection unit 44 judges that the data collection device 10 does not require the latest monitoring data, the monitoring data collection unit 44 sends the monitoring data stored in the storage unit 45 to the second protocol conversion unit 43. In this situation, the second protocol conversion unit 43 does not send to the second main protocol communication unit 42 the polling signal obtained from the packet received by the second auxiliary protocol communication unit 41.

As seen from the above, the second relay 40 is configured to judge, with reference to the identification information included in the received polling signal, whether or not the data collection device 10 requires the latest monitoring data. The second relay 40 is configured to send the received polling signal to the second main protocol communication unit 42 upon judging that the data collection device 10 requires the latest monitoring data, and to send the monitoring data (old monitoring data) stored in the storage unit 45 to the second protocol conversion unit 43 upon judging that the data collection device 10 does not require the latest monitoring data.

As shown in FIG. 2, when the data collection device 10 transmits the polling signal (the polling signal having the identification flag being on) requiring the latest monitoring data (S15), the first main protocol communication unit 31 receives the transmitted polling signal. The first protocol conversion unit 33 encapsulates the received polling signal (identification information and address of the monitoring terminal to be polled), thereby generating the packet. The first auxiliary protocol communication unit 32 transmits the generated packet to the second relay 40 (S25).

When the second auxiliary protocol communication unit 41 receives the packet, the second protocol conversion unit 43 obtains the polling signal (address of the monitoring terminal 20) from the received packet. In this time, when the obtained address is not identical to the address of the monitoring terminal 20 stored in the storage unit 45, the packet is discarded. By contrast, when the obtained address is identical to the address of the monitoring terminal 20 stored in the storage unit 45, the monitoring data collection unit 44 judges, with reference to the identification information included in the received polling signal, whether or not the data collection device 10 requires the latest monitoring data. In the present situation, since the identification flag is on, the monitoring data collection unit 44 judges that the data collection device 10 requires the latest monitoring data.

In this situation, the second protocol conversion unit 43 obtains the polling signal from the packet received by the second auxiliary protocol communication unit 41 and sends the same to the second main protocol communication unit 42. The second main protocol communication unit 42 transmits to the monitoring terminal 20 the polling signal received from the second protocol conversion unit 43 (S35).

The monitoring terminal 20 which has own address identical to the destination address of the polling signal transmitted by the second main protocol communication unit 42 performs the following operation. The monitoring terminal 20 sends to the second relay 40 the response signal including the measurement (the latest monitoring information) measured after receiving the polling signal (S36). The second protocol conversion unit 43 encapsulates the response signal received by the second main protocol communication unit 42 to generate the packet and sends the generated packet to the second auxiliary communication unit 41. The second auxiliary protocol communication unit 41 transmits the packet generated by the second protocol conversion unit 43 to the first relay 30 (S26).

When the first auxiliary protocol communication unit 32 receives the packet, the first protocol conversion unit 33 obtains the response signal (the latest monitoring data and address of the monitoring terminal 20) from the received packet, and sends the same to the first main protocol communication unit 31. The first main protocol communication unit 31 transmits to the data collection device 10 the response signal received from the first protocol conversion unit 33 (S16). Thus, the data collection device 10 obtains the latest monitoring data of the monitoring terminal 20.

As described in the above, according to the present embodiment, the data collection device 10 and the monitoring terminal 20 communicate with each other in accordance with the main protocol as is made conventionally. By contrast, the first relay 30 and the second relays 40 both interposed between the data collection device 10 and the monitoring terminals 20 communicate with each other in accordance with the auxiliary protocol different from the main protocol. Therefore, a topology of the data collection device 10 and the monitoring terminals 20 is not restricted by RS 485. Moreover, the topology of the first relay 30 and the second relay 40 can be arbitrarily selected from any one of known (existing or available) topologies. For example, a star topology or bus topology can be adopted as the topology of the first relay 30 and the second relays 40. In addition, with regard to the maximum number of the monitoring terminals 20 from which the single data collection device 10 can collect the monitoring data, it is possible to alleviate the restriction of the communication method resulting from the use of RS 485. Further, the first relay 30 and the second relay 40 make a transmission and reception of the digitally modulated packet. Therefore, a communication speed between the first relay 30 and the second relays 40 can be easily increased to exceed a communication speed between the data collection device 10 and the first relay 30 and also a communication speed between the second relay 40 and the monitoring terminal 20.

In the present embodiment, the data collection device 10 and the monitoring terminals 20 communicate with each other in accordance with the conventional polling method. Therefore, the time necessitated for the data collection device 10 to collect the monitoring data from all the monitoring terminals 20 increases as the number of the monitoring terminals 20 which the single data collection device 10 can monitor is increased. Meanwhile, the monitoring terminals 20 of up to 31 can be connected to the second main protocol communication unit 42 of the second relay 40 via the third communication cable 53. Therefore, a communication speed between the second main protocol communication unit 42 and the monitoring terminals 20 can not exceed a conventional communication speed (around 10 kbps) between the data collection device 10 and the monitoring terminals 20.

However, in the remote monitoring system of the present embodiment, the data collection device 10 is connected to only the first relay 30 via the first communication cable 51. In contrast to a situation where the data collection device 10 is connected to the plural monitoring terminals 20 via the first communication cable 51, the first communication cable can be shortened. As a result, the data collection device 10 and the first relay 30 can communicate with each other at the communication speed which is faster than the communication speed between the second relays 40 and the monitoring terminals 20.

For example, when the communication speed between the second relays 40 and the monitoring terminals 20 remains equivalent to the conventional speed (10 kbps), it is possible that the data collection device 10 reduces the time for collecting of the monitoring data. In this instance, the remote monitoring system can be configured such that the communication speed according to the main protocol between the data collection device 10 and the first relay 30 exceeds the communication speed of 10 kbps.

In consideration of the above, in the remote monitoring system of the present embodiment, the communication speed between the data collection device 10 and the first relay 30 is selected to be faster than the communication speed between the monitoring terminal 20 and the second relay 40.

In addition, according to the present embodiment, the second relay 40 collects the monitoring data from the monitoring terminals 20 and stores the same in the storage unit 45, autonomously. Further, upon being polled by the data collection device 10, the second relay 40 reads out the monitoring data stored in the storage unit 45 and sends back the same. Therefore, it is possible to shorten the time necessitated for the data collection device 10 to collect the monitoring data of the monitoring terminals 20.

Moreover, the first relay 30 is configured to measure the communication speed between the data collection device 10 and the first relay 30, and adjust the communication speed depending on the measured communication speed. Herein, the communication speed between the data collection device 10 and the first relay 30 is selected in consideration of a length of the first communication cable to which the data collection device 10 and the first relay 30 are connected, influence of noisy environment, and the like. For example, preferably, the communication speed between the data collection device 10 and the first relay 30 is maximized under a condition where an error rate of a communication between the first relay 30 and the data collection device 10 does not exceed a predetermined threshold. For example, the first main protocol communication unit 31 is configured to vary the communication speed between the first relay 30 and the data collection device 10, and determine the error rate of the communication between the first relay 30 and the data collection device 10 corresponding to the varied communication speed between the first relay 30 and the data collection device 10. The first main protocol communication unit 31 is further configured to maximize the communication speed between the first relay 30 and the data collection device 10 under a condition the determined error rate does not exceed the predetermined threshold.

The invention claimed is
1. A remote monitoring system comprising:
a plurality of monitoring terminals each configured to monitor an electric device and generate a monitoring data indicative of monitoring information of said electric device; and
a data collection device configured to poll said plurality of said monitoring terminals to collect the monitoring data therefrom,
wherein said remote monitoring system comprises:
a first relay connected to said data collection device; and
a plurality of second relays each connected to said first relay and a plurality of said monitoring terminals,
said data collection device being configured to send a polling signal for said monitoring terminal to said first relay in accordance with a main protocol,
each of said monitoring terminals being configured to, upon receiving the polling signal, send a response signal including the monitoring data to said connected second relay in accordance with the main protocol,
said first relay including a first main protocol communication unit, a first auxiliary protocol communication unit, a first protocol conversion unit configured to transfer a signal between said first main protocol communication unit and said first auxiliary protocol communication unit,
said first main protocol communication unit being configured to communicate with said data collection device in accordance with the main protocol,
said first auxiliary protocol communication unit being configured to communicate with said plurality of said second relays in accordance with an auxiliary protocol different from the main protocol,
said first protocol conversion unit being configured to make a protocol conversion between the main protocol and the auxiliary protocol when transferring a signal, said second relay including a second auxiliary protocol communication unit, a second main protocol communication unit, a second protocol conversion unit configured to transfer a signal between said second auxiliary protocol communication unit and said second main protocol communication unit, said second auxiliary protocol communication unit being configured to communicate with said first relay in accordance with the auxiliary protocol, said second main protocol communication unit being configured to communicate with said connected monitoring terminal in accordance with the main protocol, said second protocol conversion unit being configured to make a protocol conversion between the main protocol and the auxiliary protocol when transferring a signal, and a communication speed between said data collection device and said first relay being selected to be faster than a communication speed between said monitoring terminal and said second relay;

wherein said second relay includes a monitoring data collection unit configured to poll said monitoring terminal connected to said second relay to collect the monitoring data therefrom, and a storage unit configured to store the monitoring data collected by said monitoring data collection unit, said monitoring data collection unit being configured to, when said second auxiliary protocol communication unit receives the polling signal corresponding to said monitoring terminal connected to said second relay, retrieve from said storage unit the monitoring data of the monitoring terminal corresponding to the received polling signal and send the same to said second protocol conversion unit, and said second protocol conversion unit being configured to convert the monitoring data received from said monitoring data collection unit into a signal in conformity with the auxiliary protocol, and send the same to said second auxiliary protocol communication unit; and wherein said first main protocol communication unit is configured to determine an error rate of a communication between said first relay and said data collection device, and maximize the communication speed between said first relay and said data collection device under a condition the determined error rate does not exceed a predetermined threshold.

2. A remote monitoring system as set forth in claim 1, wherein said remote monitoring system includes a communication cable which has two signal lines for connection of said second relay and said first relay, said first relay including a power unit configured to supply an electric power, which is generated from the DC voltage applied across said two signal lines, to said first main protocol communication unit, said first auxiliary protocol communication unit, and said first protocol conversion unit.

3. A remote monitoring system as set forth in claim 2, wherein said first main protocol communication unit is configured to determine an error rate of a communication between said first relay and said data collection device, and maximize the communication speed between said first relay and said data collection device under a condition the determined error rate does not exceed a predetermined threshold.

4. A remote monitoring system as set forth in claim 1, wherein said remote monitoring system includes a communication cable which has two signal lines for connection of said second relay and said first relay, said second relay including a power unit configured to supply an electric power, which is generated from the DC voltage applied across said two signal lines, to said second main protocol communication unit, said second auxiliary protocol communication unit, and said second protocol conversion unit.

5. A remote monitoring system as set forth in claim 4, wherein said first main protocol communication unit is configured to determine an error rate of a communication between said first relay and said data collection device, and maximize the communication speed between said first relay and said data collection device under a condition the determined error rate does not exceed a predetermined threshold.

6. A remote monitoring system as set forth in claim 1, wherein said data collection device is configured to send the polling signal which includes identification information indicative of whether or not said data collection device requires the latest monitoring data, said second relay being configured to judge, with reference to the identification information included in the received polling signal, whether or not said data collection device requires the latest monitoring data, said second relay being configured to send the received polling signal to said second main protocol communication unit upon judging that said data collection device requires the latest monitoring data, and said second relay being configured to send the monitoring data stored in said storage unit to said second protocol conversion unit upon judging that said data collection device does not require the latest monitoring data.

7. A remote monitoring system as set forth in claim 6, wherein said first main protocol communication unit is configured to determine an error rate of a communication between said first relay and said data collection device, and maximize the communication speed between said first relay and said data collection device under a condition the determined error rate does not exceed a predetermined threshold.

8. A remote monitoring system as set forth in claim 1, wherein said first main protocol communication unit is configured to determine an error rate of a communication between said first relay and said data collection device, and maximize the communication speed between said first relay and said data collection device under a condition the determined error rate does not exceed a predetermined threshold.

* * * * *